United States Patent
Minai (10) Patent No.: US 6,974,187 B2
(45) Date of Patent: Dec. 13, 2005

(54) VEHICLE SEAT STRUCTURE

(75) Inventor: Masamitsu Minai, Tokyo (JP)

(73) Assignee: Tachi-S Co., Ltd., Tokyo (JP)

(*) Notice: Subject to any disclaimer, the term of this patent is extended or adjusted under 35 U.S.C. 154(b) by 80 days.

(21) Appl. No.: 10/765,212

(22) Filed: Jan. 28, 2004

(65) Prior Publication Data

US 2005/0161988 A1    Jul. 28, 2005

(51) Int. Cl.$^7$ ............................................. B60N 2/42
(52) U.S. Cl. .................................................. 297/216.1
(58) Field of Search .......................... 297/216.1, 468, 297/464

(56) References Cited

U.S. PATENT DOCUMENTS

| | | | |
|---|---|---|---|
| 5,908,219 A * | 6/1999 | Bohmler .................. | 297/216.1 |
| 6,050,635 A * | 4/2000 | Pajon et al. ............. | 297/216.1 |
| 6,254,181 B1 * | 7/2001 | Aufrere et al. .......... | 297/216.1 |
| 6,450,573 B1 * | 9/2002 | Yamaguchi et al. ..... | 297/216.1 |
| 6,648,409 B1 * | 11/2003 | Laporte .................. | 297/216.1 |
| 6,755,465 B2 * | 6/2004 | Yamaguchi et al. ..... | 297/216.1 |
| 2002/0003365 A1 * | 1/2002 | Yamaguichi et al. .... | 297/216.1 |

FOREIGN PATENT DOCUMENTS

| JP | 07-081466 | 3/1995 |
|---|---|---|
| JP | 2002-002345 | 1/2002 |

* cited by examiner

Primary Examiner—Milton Nelson, Jr.
(74) Attorney, Agent, or Firm—Browdy and Neimark, P.L.L.C.

(57) ABSTRACT

A vehicle seat structure wherein a forward buttocks preventive element is movably provided against an emergency case. A rotatable arm, to which the forward buttocks preventive element is fixed, has a connecting pin slidably engaged in a guide hole formed in an actuator plate which is rotatably provided in the seat cushion. The actuator plate may be biasingly toggled between operative and inoperative positions under a biasing force of biasing element relative to a dead point. A seat belt control mechanism is operatively connected with that actuator plate. A great load applied in emergency case to the seat belt control mechanism causes both actuator plate and arm to rotate toward the operative position, thereby displacing the forward buttocks preventive element from a home position to a point for receiving a passenger's buttocks portion. The vehicle seat structure allows the forward buttocks preventive element to be returned to the home position.

8 Claims, 3 Drawing Sheets

VEHICLE SEAT STRUCTURE

BACKGROUND OF THE INVENTION

1. Field of the Invention

The present invention relates to a structure of vehicle seat which prevents a passenger from being slipped and slid forwardly on the seat when a collision or the like occurs. In particular, the invention is directed to a vehicle seat structure of this kind wherein a vertically movable forward slippage preventive element is provided in a seat cushion of the seat.

2. Description of Prior Art

In the case of an abrupt deceleration or stop of a vehicle, a passenger on a seat in the vehicle is naturally caused to displace forwardly due to inertia. Such forward displacement of the passenger is basically prevented by a seat belt which restrains the passenger to the seat. However, in such an emergency case as a collision, stopping of the vehicle can be so abrupt that, in spite of the restraint of the seat belt, the buttocks portion of the passenger will still slip or slide forward on a seat cushion of the seat and sink into the upper elastic portion of the seat cushion, with it being of a high likelihood that the lower portion of the passenger will be damaged or injured. This is what is called "forward buttocks slippage phenomenon".

Hitherto, various attempts have been made to prevent such forward buttocks slippage phenomenon. For example, a cross rod is fixedly provided in the seat cushion as a forward buttocks slippage preventive means, the cross rod extending transversely of the forward region of the seat cushion to thereby prevent forward slippage of the passenger's buttocks portion on the seat cushion. Namely, in the case of sudden collision, the passenger's buttocks portion, which is being slipped on and sunk into the seat cushion, is quickly contacted with the cross rod and thus prevented against further forward movement, thereby protecting the lower body portion of the passenger.

However, such fixed provision of cross rod in the seat cushion has been found defective in degrading the cushion touch of the seat cushion and giving a hard touch of the cross rod itself to the buttocks portion of the passenger when he or she sits on the seat cushion.

In order to avoid such unpleasant seating touch, a vertically movable forward buttocks slippage preventive element has been proposed. Namely, it has been proposed that the forward buttocks slippage preventive element is movable between a lower inoperative position where it is normally set at a low level in the seat cushion and an upper operative position where it is raised to a level generally corresponding to a forward buttocks slippage locus along which the buttocks portion of passenger is to be slipped forwardly on the seat cushion in the case of collision or other emergency case. With this arrangement, when a sudden collision occurs, tending to cause a passenger to slip forwardly on the seat cushion, the forward buttocks slippage preventive element is quickly rotated upwardly to the upper operative position to receive the passenger's buttocks portion. For example, this sort of seat structure has been known from the Japanese Laid-Open Patent Pub. No. 7-81466 disclosing an air-bag type arrangement which uses an air bag to prevent the forward buttocks slippage, or the Japanese Laid-Open Patent Pub. No. 2002-2345 disclosing a seat-belt type arrangement which causes vertical movement of a forward buttocks slippage element responsive to a movement of seat belt.

According to the former publication No. 7-81466, a great load caused in an emergency case is detected by a sensor system which in turn sends a signal to a drive mechanism and then an air bag is inflated by the inflating mechanism to raise a forward buttocks slippage preventive plate in the seat cushion. But, such provision of sensor system and inflating mechanism result in making the seat structure complicated and increasing costs involved in assembly thereof, which further increases a whole weight of the seat. In addition thereto, once the air bag has been inflated, it is quite difficult to return the inflated air bag into a normal non-inflate state and re-set the same in a normal storage location, thus requiring replacement air bags for re-use.

On the other hand, according to the latter publication No. 2002-2345, a slidable support member provided with a seat belt buckle, on which a seat cushion is mounted, is slidably engaged with a slide rail device and so arranged as to have an interlocked relation with a forward buttocks slippage preventive element provided in the forward regions of seat back. In a collision or the like, the seat belt, by which a passenger is restrained in the seat, is forcibly pulled forwardly under the influence of inertia, which causes forward movement of the slidable support member and seat cushion relative to the slide rail device. Responsive thereto, the forward buttocks slippage preventive element is raised to receive the buttocks portion of the passenger. Further, the forward buttocks slippage preventive element can be returned to a normal non-use position and a whole of the device can be re-used against another emergency case. Thus, this prior art is superior to the foregoing prior art (7-81466) in terms of simplified structure which does not require any sensor and inflating mechanism and recovery or re-use possibility. However, in this Pub. No. 2002-2345, the seat back itself is moved forwardly to prevent the forward buttocks slippage, which means that it is highly possible for a passenger to be moved with the seat toward a steering wheel or a panel disposed forwardly of the passenger and therefore the passenger may collide with those vehicle interior parts and may be damaged or injured thereby. With this undesired case in view, a technical person will contemplate on providing a biasing means for biasingly returning the seat cushion backwardly to a home position in response to a forward inertia in a collision case or the like. Nonetheless, when the seat cushion is be moved forwardly in a collision or 'the like under inertia, the seat is quickly returned under a biasing force of the biasing means to the home position, which will adversely give an abrupt backward counter force to the passenger. If such backward biasing force is extremely great, the returning of seat is so quick that the passenger will be subjected to a secondary great impact in the backward direction, and thus, he or she may be damage or injured by such secondary great impact. Also, the forward sliding movability of seat back in this prior art will reduce the forward inertia, as a result of which, a whole of the seat back will not be moved to a point sufficient enough to raise the forward buttocks slippage preventive element, or, depending on the situation, the forward buttocks slippage preventive element will be quickly returned to a home position under the backward biasing force of the biasing means and will not work to prevent the passenger's buttocks portion against forward slippage on the seat cushion.

SUMMARY OF THE INVENTION

In view of the above-stated drawbacks, it is a primary purpose of the present invention to provide an improved structure of vehicle seat which is quite simple to effectively prevent the forward buttocks slippage in conjunction with a seat belt.

In order to achieve such purpose, a vehicle seat structure in accordance with the present invention is basically comprised of:

a pair of arms rotatably provided in the seat cushion, the pair of arms each having one end to which the forward buttocks slippage preventive means is fixed, such that rotation of the pair of arms causes displacement of the forward buttocks slippage preventive element between the operative position and an inoperative position where the forward buttocks slippage preventive element is located away from the operative position and thus away from the forward buttocks slippage locus;

an actuator plate rotatably provided in the seat cushion, the actuator plate having a guide hole formed therein;

the pair of arms having a connecting pin formed in another end thereof, the connecting pin being slidably engaged in the guide hole of the actuator plate;

a biasing means so arranged as to biasingly cause the actuator plate to rotate to a selected one of a first limit point corresponding to the operative position and a second limit point corresponding to the inoperative position in relation to a dead point, thereby allowing the actuator plate to be biasingly toggled between the first and second limits in relation to the dead point;

a first stopper means disposed at the first limit point;

a second stopper means disposed at the second limit point;

a seat belt control means for normally biasing the seat belt to a home position and allowing the seat belt to be movable toward the forward side of the seat cushion by a great forward load applied from the passenger who is about to be moved to the forward side of the seat cushion under the influence of the excessive forward inertia in the emergency case; and a connecting means for operatively connecting the seat belt control means with the connecting pin;

wherein, normally, the actuator plate is biased by the biasing means to the second stopper means, such that the biasing means is located above the dead point, thereby resiliently retaining the forward buttocks slippage preventive element in the inoperative position, and wherein, in the emergency case, the great forward load draws the seat belt toward the forward side through the seat belt control means, while being imparted through the connecting means to the connecting pin, thereby in turn causing the actuator plate to rotate toward the first stopper means, overcoming a biasing force of the biasing means, so that the biasing means is displaced to a point below the dead point, while simultaneously causing rotation of both pair of arms and forward buttocks slippage preventive element in a direction to the operative position, as a result of which, the actuator plate is biased to contact with the first stopper means, whereby the actuator plate is positively retained at a point to prevent rotation of the arms toward the inoperative position, thereby preventing further forward rotation of the forward buttocks slippage preventive element from the operative position.

Preferably, the guide hole may be formed in a free end portion of the actuator plate in a sinuous manner along a locus in which the connecting pin is to be moved in the actuator plate with rotation of the pair of arms due to a deviation in circular orbit between such another end of the each of the pair of arms and the free end portion of the actuator plate, wherein the guide hole has one end and another end. Thus, when the actuator plate is biased by the biasing means to the second stopper means, the connecting pin is engaged in the one end of the guide hole, so that the forward buttocks slippage preventive element is retained in the inoperative position, and when the actuator plate is biased by the biasing means to the first stopper means, the connecting pin is engaged in the foregoing another end of the guide hole, such that the actuator plate is positively retained at a point to prevent the reverse rotation of the pair of arms, thereby preventing further forward rotation of the forward buttocks slippage preventive element from the operative position.

Preferably, the foregoing dead point may be defined near to the second limit point.

Preferably, the seat belt control means may comprise: a seat belt buckle releasably connected with the seat belt; a rotary link member rotatably provided in the seat cushion, the rotary link member being connected with the seat belt buckle at one end thereof; a return spring means for resiliently biasing the rotary link member in one direction to retain the seat belt buckle at a home position; a cable wire; and an elongated ring member having an elongated hole formed therein, wherein the connecting pin is slidably engaged in the elongated hole of the elongated ring member, and wherein the cable wire is extended and connected between another end of the rotary link member and the elongated ring member, with such an arrangement that, in the emergency case where the great forward load draws the seat belt buckle and seat belt toward the forward side, the rotary link member is rotated in another direction, overcoming a biasing force of the return spring means, thereby drawing the cable wire to cause sliding movement of the connecting pin in and along the elongated ring member, which results in causing the actuator plate to rotate from the second stopper means toward the first stopper means against a biasing force of the biasing means, so that the biasing means is displaced to a point below the dead point, while simultaneously causing rotation of both arms and forward buttocks slippage preventive element in a direction to the operative position.

Other various features and advantages of the present invention will become apparent from reading of the description hereinafter, with reference to the annexed drawings.

DETAILED DESCRIPTION OF PREFERRED EMBODIMENT OF THE INVENTION

Figure 1:
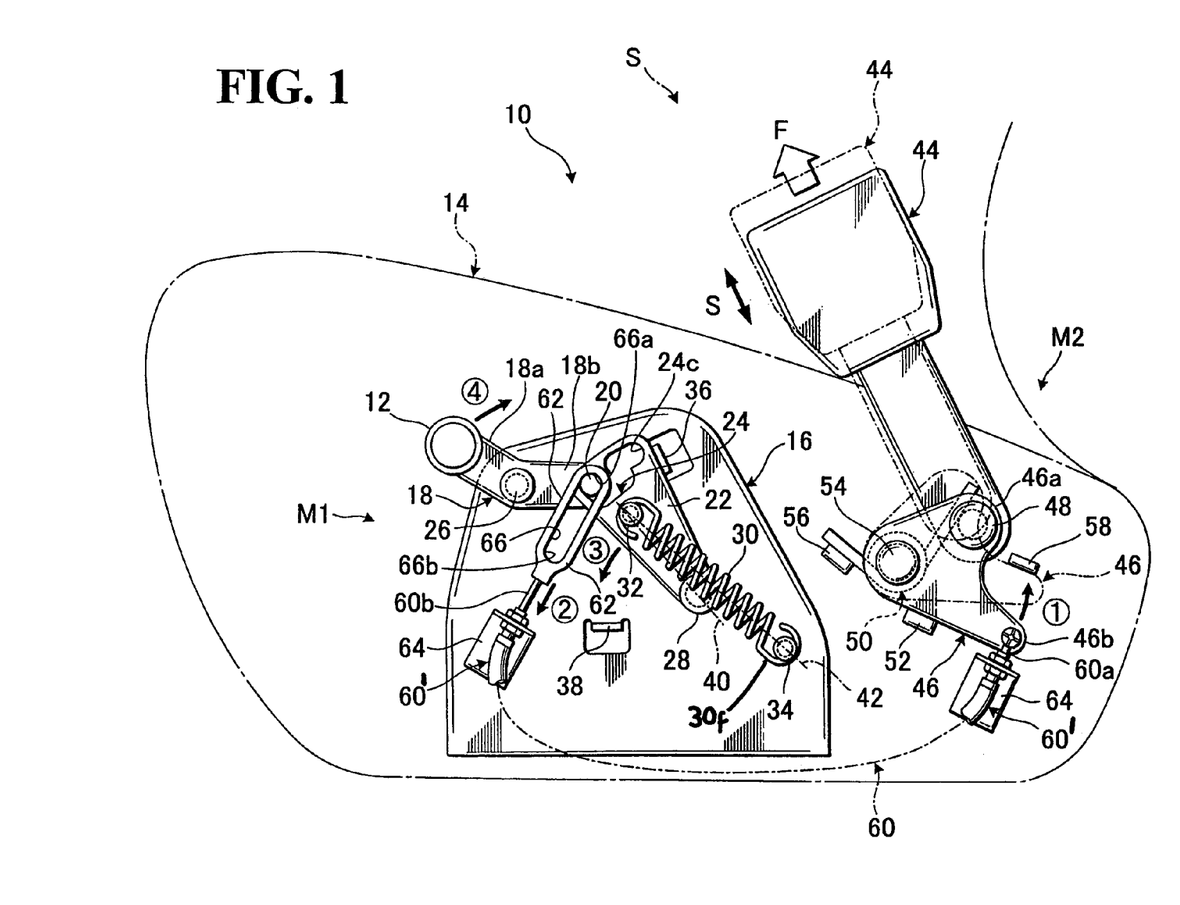
FIG. 1 is a partly broken schematic side elevation view of a vehicle seat structure in accordance with the present invention, which shows an inoperative state of the vehicle seat structure.
Figure 2:
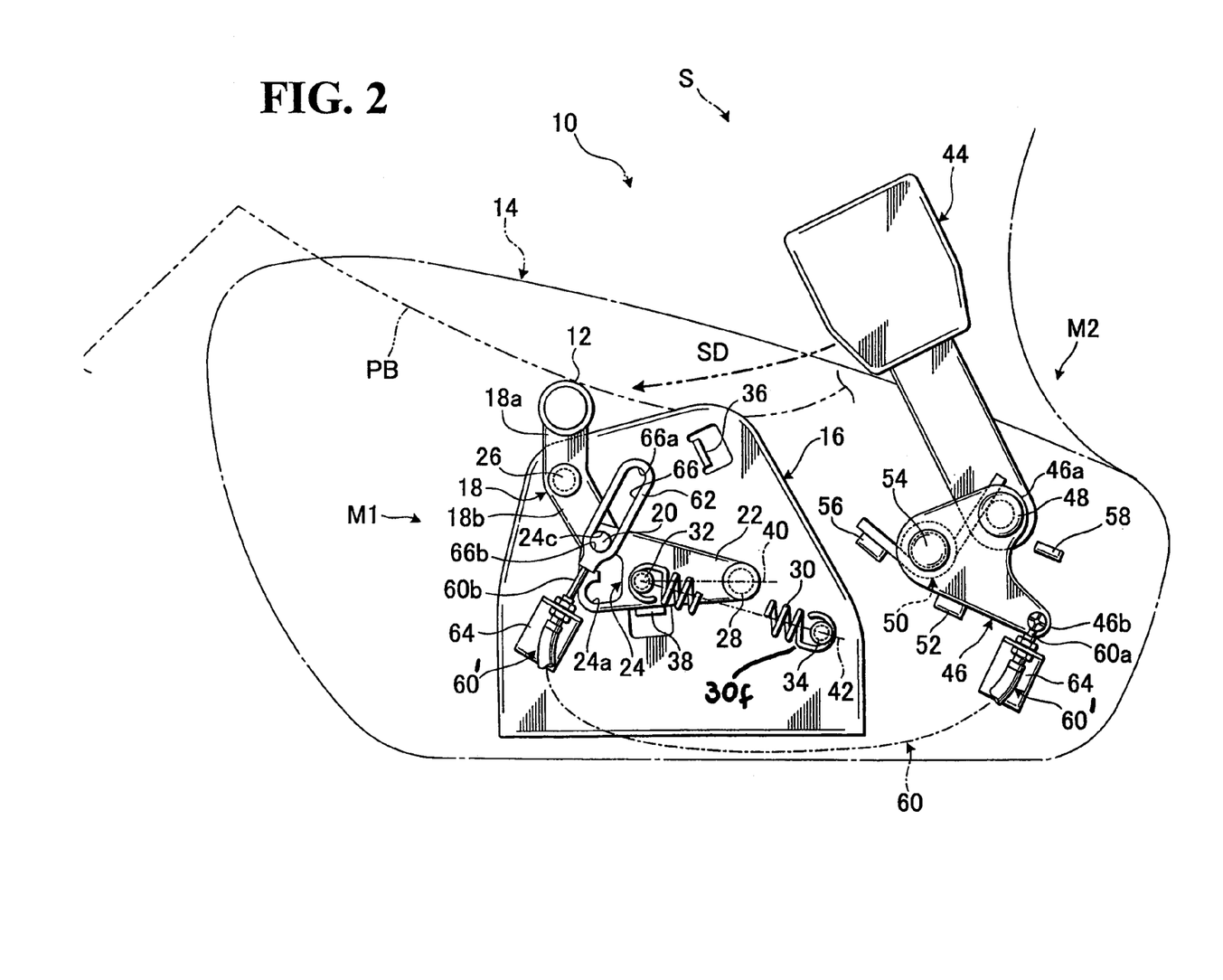
FIG. 2 is a partly broken schematic side elevation view of a vehicle seat structure in accordance with the present invention, which shows an operative state of the vehicle seat structure.
Figure 3:
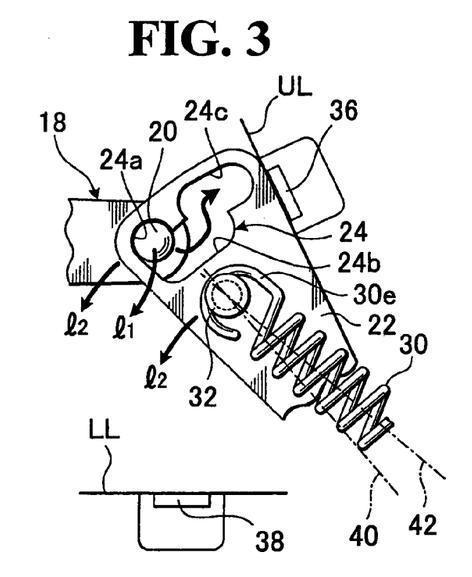
FIG. 3 is a diagram for explanatorily showing action of a principal part of the present invention, wherein a central axis of spring is located above a dead point.

Referring to FIGS. 1 to 3, there is illustrated one preferred embodiment of vehicle seat structure as generally designated by (10) in accordance with the present invention.

As best shown in FIG. 3, a pair of spaced-apart vertically extending base plate members (16) (16) are provided in a seat cushion (14) of vehicle seat (S) so as to be disposed at the respective two lateral sides of the seat cushion (14). Though not shown, those two base plate members (16) are fixedly attached to a seat cushion frame within the seat cushion (14).

A pair of arms (18) are each rotatably connected at the intermediate region thereof with the outer side of the upper portion of each of the base plate members (16) by means of a pin (28).

A horizontal bar element (12) is fixedly extended between the two forward ends (18a) respectively of the two arms (18) so as to be disposed horizontally and transversely of the seat cushion (14) as seen in FIG. 3.

Thus, both horizontal bar element (12) and two arms (18) are rotatable vertically about the pins (28) with respect to the two base plate members (16). In this respect, as understandable from FIG. 2, the horizontal bar element functions as a forward buttocks slippage preventive element for preventing a buttocks portion (PB) of passenger from being slipped forwardly on the seat cushion (12) while being sunk thereinto, under the influence of a forward excessive inertia, in such an emergency case as a collision. As will be described later, the horizontal bar member (12) may be rotated upwardly to a given point in a forward buttocks slippage locus along which the buttocks portion (PB) of passenger is to be slipped forwardly on the seat cushion (14) as indicated by the two-dot chain arrow (SD), thereby to receive the passenger's buttocks portion (PB) and prevent it against further forward movement in the case of collision or other emergency case. The horizontal bar element (12) may be formed from a tubular metallic material as illustrated. The two ends of the horizontal bar element (12) are firmly connected as by welding with the two upper end portions respective of the two arms (18) and situated within the seat cushion (14).

In accordance with the present invention, a toggle mechanism (M1) is provided for allowing the arms (18) and horizontal bar element (12) to be rotated about their respective pivot pins (26) and biasingly toggled between a normal inoperative position and an upstanding operative position in relation to a toggling point or the so-called "dead point" (40).

Also, provided is a seat belt control mechanism (M2) for detecting a force tending to pull a seat belt (SB) and imparting the force to the toggle mechanism (M1), while minimizing a stroke of seat belt buckle (44). By way of preferred example, as viewed from FIG. 3, a pair of left-side and right-side toggle mechanisms (M1) are provided to the respective pair of base plate members (16) and a pair of left-side and right-side seat belt control mechanisms (M2) are provided in and rearwardly of the seat cushion (14) so as to be disposed at the respective two lateral sides of the seat cushion (14).

Now, a specific description will be made only about the left-side toggle mechanism (M1) and the right-side seat belt control mechanism (M2) for the sake of simplicity.

The toggle mechanism (M1) basically comprises the backward end (18b) of the arm (18), a connecting pin (20), an actuator plate (22), a biasing spring (30) and an elongated connecting ring (62).

The arm (18) itself is of a generally "V" shape and has: the forward end (18a) to which the horizontal bar element (12) is fixed as stated previously; a midway portion rotatably connected with the pivot pin (26); and a backward end (18b) having a connecting pin (20) formed therein. Hence, as shown, the arm (18) is rotatably connected at the midway portion thereof, by the pivot pin (26), with the outer vertical side of the base plate member (16). Particularly, the arm (18) is disposed in a forward upper region of that base plate member (16).

The actuator plate (22) is of a generally sector configuration having a sinuous guide hole (24) formed in one free divergent end portion thereof. Another convergent base end of the actuator plate (22) is rotatably connected by a pivot pin (28) with the outer vertical side of the base plate member (16). As shown, the actuator plate (22) is disposed in a backward region of that particular base plate member (16), such that its rotation center (at 28) is situated lower than the rotation center (at 26) of the arm (18).

The biasing spring (30) is a pulling spring which is extended in a resiliently stretched state between the actuator plate (22) and the base plate member (16), the spring (30) acting to give a toggle effect to the vertical rotation of to the actuator plate (22). This spring (30) is at one end (30e) thereof securely engaged with a securing pin (32) formed in the free end portion of the actuator plate (22) at a point adjacent to the sinuous guide hole (24), while being at another end (30f) thereof securely engaged with a securing pin (34) fixed to the base plate member (16), so that the actuator plate (22) is biasingly caused by the spring (30) to rotate about the pivot pin (28) or toggle in one of upward and downward directions in relation to the dead point (40).

On the other hand, such vertical biased rotation of the actuator plate (22) is limited by means of an upper stopper (36) and a lower stopper (38). Namely, the upper and lower stoppers (36) (38) may be formed, as illustrated, by punching out their corresponding local regions of the base plate member (16) and upturning them outwardly at a right angle relative thereto, such that the upper stopper (36) is disposed at a point to limit the upward rotation of the actuator plate (22) at a fixed upper position UL, while the lower stopper (38) disposed at a point to limit the downward rotation of the actuator plate (22) at a fixed lower position LL.

In this context, it is noted that the afore-said dead point (40) is defined to be an imaginary rectilinear line extending through the rotation center (at 28) and securing pin (32) of the actuator plate (22) on the condition that a central axis (42) of the spring (30) will be brought in conformity with that imaginary rectilinear line, in which case, the biasing force of spring (30) will become null and inactive to the actuator plate (22), and that the biasing direction in which the biasing force of spring (30) is applied to the actuator plate (22) will be changed over in relation to the dead point (40). That is, as viewed from FIGS. 1 and 2, when the central axis (42) of the spring (30) is located above the dead point (40), the biasing force of that particular spring (30) is active in an upward direction to biasingly cause upward or clockwise rotation of the actuator plate (22) about the pin (28). By contrast, when the spring central axis (42) is located below the dead point (40), the biasing force of spring (30) becomes active downwardly, thereby biasingly causing downward or anticlockwise rotation of the actuator plate (22) about the pin (28).

With such toggle mechanism, as understandable from FIGS. 1 and 2, the actuator plate (22) may be selectively biased into contact with one of the upper and lower stoppers (36) (38) under the biasing force of spring (30). Preferably, as can be seen in FIG. 1, the dead point (40) should be defined at a point near to the upper stopper (36), as will be explained later.

The afore-said connecting pin (20) formed in the arm (18) is silidably engaged in the sinuous guide hole (24) of the actuator plate (22), which establishes an interlocking relation between the arm (18) and actuator plate (22).

In this context, the formation of the sinuous guide hole (24) is based on a deviation in circular orbit between the arm end (18b) (i.e. the connecting pin (20)) and the free end portion of the sector actuator plate (22). That is, as best understandable from FIG. 3, a radius of a circle along which the arm end (18b) is rotated about the pin (26) as indicated by the arrow (l1) is different from a radius of a circle along which the free end of the sector actuator plate (22) is rotated about the pin (28) as indicated by the arrow (l2), and such difference in radius causes deviation in circular orbit between the connecting pin (20) and the free end portion of actuator plate (22), which in turn creates a sinuous locus along which the connecting pin (20) is to be moved sinuously in that free end portion of actuator plate (22) as indicated by the sinuous arrow.

Considering such sinuous connecting pin displacement locus, the guide hole (24) is formed in the illustrated generally sinuous shape in the free end portion of actuator plate (22) so as to have, defined therein, a first hole region (24a), a second hole region (24b) and a third hole region (24c). The first hole region (24a) is formed in an outward radius direction from the pin (28). On the other hand, the second and third hole regions (24b) (24c) are formed in a circumferential direction relative to the pin (28) and in an offset relation with each other, such that the former (24b) is situated inwardly of the actuator plate (22) near to that pin (28) (i.e. from that first hole region (24a)), while the latter (24c) is situated distant from the pin (28) and outwardly of the actuator at a point level with the foregoing fist hole region (24a).

In this connection, as stated earlier, the arms (18) and horizontal bar element (12) are rotated about their respective pivot pins (26) and toggled by the toggle mechanism (M1) between a normal inoperative position and an upstanding operative position in relation to the dead point (40). Comparative view between FIGS. 1 and 2 indicates that, in the normal inoperative position, the horizontal bar element (12) is positioned inwardly of the seat cushion (14) away from the forward buttocks slippage locus indicated by (SD), whereas on the contrary, in the upstanding operative position, the horizontal bar element (12) is positioned at a point within a range in which the forward buttocks slippage locus occurs adjacent to the upper surface of the seat cushion (14).

Figure 4:
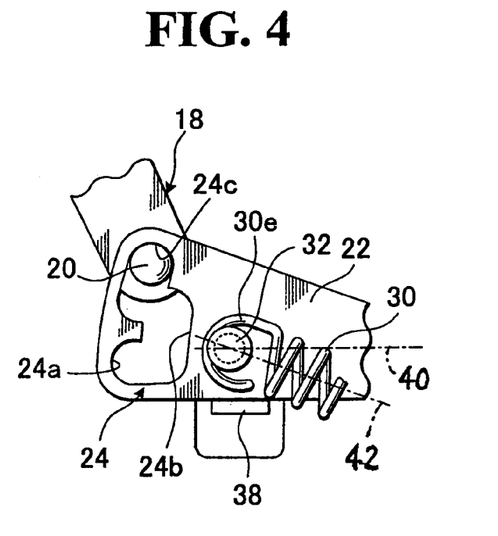
FIG. 4 is a diagram for explanatorily showing action of the principal part, wherein a central axis of spring is located below the dead point.

In order for the arms (18) and horizontal bar element (12) to be rotated to and retained at one of the those inoperative and operative positions, the length and size of the sinuous guide hole (24) should be properly predetermined in the actuator plate (22), and the upper and lower stoppers (36) (38) should also be defined at their respective proper positions in the actuator plate (22). In other words, the arrangement of those elements is such that, when the actuator plate (22) is biased by the spring (30) in the upward direction and retained by the upper stopper (36), the connecting pin (20) is positioned in the first hole region (24a) of sinuous guide hole (24) so as to retain the arm (18) in the normal inoperative position as shown in FIGS. 1 and 3, and that, on the other hand, when the actuator plate (22) is biased by the spring (30) in the downward direction and retained by the lower stopper (38), the connecting pin (20) is positioned in the third hole region (24c) of sinuous guide hole (24) so as to retain the arm (18) in the generally upstanding operative position as shown in FIGS. 2 and 4.

Designation (60) denotes a flexible wire cable engaged in a housing 60' opposite ends of which are fixed on base plate member 16 by supports 64. Wire cable 60 extends between the above-described toggle mechanism (M1) and the seat belt control mechanism (M2) to be described later. Fixedly connected with one end (60b) of the wire cable (60) is an elongated connecting ring (62) having an elongated guide hole (66) in which the foregoing connecting pin (20) is slidably connected.

In accordance with the present invention, the seat belt control mechanism (M2) is provided backwardly of the toggle mechanism (M1) and operatively connected with a seat belt buckle (44). The seat belt control mechanism (M2) comprises a rotary link member (46), a pair of upper and lower stoppers (58) (52) for limiting vertical rotation of the rotary link member (46), and a return spring (50).

Specifically, the illustrated rotary link member (46) is of a generally "V" shape having an upper end (46a) and lower end (46b). This rotary link member (46) has an intermediate portion between those two ends (46a) (46b), which is fixed to a pivot pin (54) rotatably supported on a seat cushion frame (not shown) provided in the seat cushion (14).

As shown, the upper end (46a) of the rotary link member (46) is rotatably connected by a pin (48) with the seat belt buckle (44), while the lower end (46b) of the same link (46) is fixedly connected with another end (60a) of the wire cable (60). The rotary link member (46) is normally biased by the return spring (50) clockwise into contact with the lower stopper (52), wherein the return spring (50) is fixed to the pin (54) at the winding portion thereof, with one and another ends thereof being secured to a securing lug (56) and the pin (48), respectively. Thus, the rotary link member (46), upon being applied by an upward force enough to overcome the biasing force of return spring (50), can be rotated anticlockwise about the pin (54) to draw the wire cable (60), thereby causing simultaneous movement of both arm (18) and actuator plate (22) as will be explained.

In the normal state shown in FIG. 1, as stated above, the rotary link member (46) is biased into contact with the lower stopper (52) by the return spring (50), which resiliently retain the seat belt buckle (44) at the home position as shown by the solid line to thereby bias the seat belt (SB) to a home position, while biasingly pushing the wire cable (60) forwardly or in a direction to the toggle mechanism (M1). Hence, the elongated connecting ring (62) is also retained at the shown home position where the connecting pin (20) is contacted with the upper edge (66a) of elongated guide hole (66) formed in that particular elongated connecting ring (62).

It is important to note that the biasing force of the return spring (50) is normally so strong as to resist an ordinary pulling force exerted from a passenger's body during running of vehicle on a rough road, but the repercussive force of return spring (50) is so adjusted that the return spring (50) itself may be resiliently bent by a certain degree of great load (F) created under the influence of forward excessive inertia which will be caused when the above-noted forward buttocks slippage occurs in such an emergency case as a collision.

Figure 5:
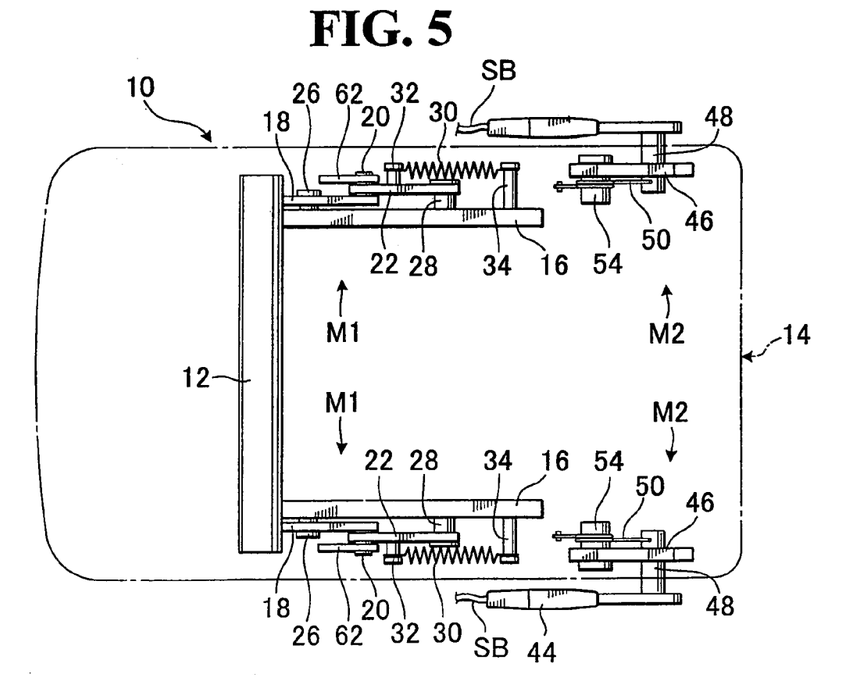
FIG. 5 is a partly broken schematic plan view showing a whole of the vehicle seat structure.

With the foregoing arrangement, as shown in FIG. 1, when a great forward load (F) is applied under a forward excessive inertia to the seat belt (see the designation (SB) in FIG. 5) connected with the buckle (44), overcoming the above-discussed biasing force of return spring (50), the buckle (44) is pulled upwardly, which causes anticlockwise rotation of the rotary link member (46) about the pin (54) as indicated by the two-dot chain lines and the arrow 1. Such anticlockwise rotation of rotary link member (46) draws the wire cable (60) connected with one end of the rotary link member (46) in the backward direction, and at the same time, the elongated connecting ring (62) connected with another end of the rotary link member (46) is displaced downwardly as indicated by the arrow 2. Since the connecting pin (20) connects together the elongated ring (62), actuator plate (22) and arm (18), the downward displacement of elongated connecting ring (62) causes simultaneous anticlockwise rotation of the actuator plate (22) about the pin (28) as indicated by the arrow 3 and also causes simultaneous clockwise rotation of the arm (18) about the pin (26) as indicated by the arrow 4. Thus, as can be seen in FIG. 2, the spring (30) is displaced downwardly to a level below the dead point (40), thereby applying a downward biasing force to both actuator plate (22) and arm (18), with the result that the actuator plate (22) is rotated anticlockwise in a direction from the upper stopper (36) to the lower stopper (38), while at the same time, the arm (18) is rotated clockwise to raise the horizontal bar element (12) to the upstanding operative position to receive the passenger's buttocks portion (PB), thereby preventing the same against further forward slippage on the seat cushion (14). At this moment, it is seen that, with the anticlockwise rotation of actuator plate (22), the connecting pin (20) is slidingly moved in and along the sinuous guide hole (24) of that actuator plate (22) and thereby the arm (18) is smoothly rotated along a given circular orbit relative to the pin (26), and that, at the same time, the connecting pin (20) is slidingly moved downwards in and along the elongated guide hole (66) to the lower edge (66b) of elongated guide hole (66).

In this connection, as noted previously, the dead point (40) is set near to the upper stopper (36). This is advantageous in minimizing a stroke (S) of upward and downward displacement of the seat belt buckle (44). In other words, the setting of the dead point (40) near to the upper stopper (36) makes toggling of the actuator plate (22) quick in the downward direction relative to the dead point (40), which further makes small the range of rotation of the rotary link member (48). Accordingly, a distance between the upper and lower stoppers (58) (52) is effectively made small, thus minimizing the movement stroke (S) of seat belt buckle (44).

It is therefore appreciated that, in a normal state excepting such emergency case as a collision, the seat belt (SB) and buckle (44) are positively retained at a given home position to restrain a passenger to the seat (S) under the strong biasing force of the spring (50), and that, in the case of emergency, when a great forward load (F) is applied to the seat belts (SB) and buckle (44), overcoming the biasing force of return spring (50), under the influence of forward excessive inertia, a very small amount of upward movement of the buckle (44) or a very little amount of anticlockwise rotation of the rotary link member (46) results in quick anticlockwise rotation of the actuator plate (22) to cause the central axis (42) of spring (30) to displace downwardly to a point below the dead point (40), whereupon, under the toggled biasing force of the spring (30), both actuator plate (22) and arm (18) are quickly rotated as indicated by the arrows in FIG. 1 to raise the horizontal bar element (12), thereby immediately preventing the passenger's buttocks portion (PB) against forward slippage on the seat cushion (14). Thus, due to such very small stroke of the buckle (44), the seat belt (SB) is assuredly prevented against excessive forward movement, so that the passenger will not be slipped further forwardly on the seat cushion (14), and also, because of the very small stroke of buckle (44), even when the seat belt (SB) having been stretched forwardly by the passenger in the emergency case is returned backwardly by the return spring (50), any serious impact and damage are not given from the returned seat belt (SB) to the passenger.

Further, once the actuator plate (22) has been brought to contact with the lower stopper (38), the biasing force of spring (30), which has been toggled downwardly relative to the dead point (40), acts to forcibly retain the actuator plate (22) in a substantially horizontal state shown in FIGS. 2 and 4. In this particular state, as best shown in FIG. 4, the connecting pin (20) is fit engaged in the vertically extending third hole region (24c) of sinuous guide hole (24), whereupon the substantially horizontally laying actuator plate (22) is in a substantially perpendicular relation with a substantially vertical line of the arm (18), which insures to prevent anticlockwise rotation of the arm (18), thus giving a firm deterrence to forward rotation of the arm (18) which is caused by a forward load imparted from the passenger's buttocks portion (PB) to the horizontal bar element (12). Hence, the horizontal bar element (12) is positively retained at the upstanding operative position sufficient to prevent the passenger's buttocks portion (PB) from being subjected to secondary forward movement on the seat cushion (14), thereby protecting the passenger against contact with a steering wheel or interior panel in contrast to the previously stated prior-art seat structure including the type having a slide rail provided thereunder.

Moreover, when the horizontal bar element (12) is located at the upstanding operative position as in FIG. 2, it is easily possible to return that horizontal bar element (12) to the inoperative position as in FIG. 1. This is because the connecting pin (20) is only engaged in the third hole region (24c) and the actuator plate (22) is readily allowed to rotate upwardly or clockwise, with the connecting pin (20) being slidingly moved along the sinuous guide hole (24) toward the first hole region (24a), which makes it possible to rotate the actuator plate (22) upwardly or clockwise, overcoming the biasing force of the spring (30), thereby rotating the arm (12) downwardly or anticlockwise about the pin (26) and thus returning the horizontal bar element (12) from the upstanding operative position shown in FIG. 2 to the inoperative position shown in FIG. 1.

In addition, the present structure (10) is quite simplified because it only uses the actuator plate (22), spring (30), cable wire (60), and rotary link member (46) to establish an interlocking relation between the seat belt buckle (44) and the arms (12).

While having described the present invention thus far, it should be understood that the invention is not limited to the illustrated embodiments, but any other modification, replacement, and addition may be applied thereto without departing from the scopes of the appended claims.

What is claimed is:

1. A vehicle seat structure, which includes a seat cushion, a seat belt provided in said seat cushion and a forward buttocks slippage preventive element provided in a forward portion of said seat cushion, said forward buttocks slippage preventive element being displaceable, to an operative position in a forward buttocks slippage locus along which a buttocks portion of a passenger is to be slipped to a forward side of said seat cushion under influence of forward inertia caused by a collision, thereby preventing forward slippage of said buttocks portion on said seat cushion, comprising:

a pair of arms rotatably provided in said seat cushion, said pair of arms each having one end to which said forward buttocks slippage preventive element is fixed, such that rotation of said pair of arms causes said forward buttocks slippage preventive element to displace between said operative position and an inoperative position where said forward buttocks slippage preventive element is located away from said operative position and thus away from said forward buttocks slippage locus;

an actuator plate rotatably provided in said seat cushion, said actuator plate having a guide hole formed therein;

said pair of arms having a connecting pin formed in another end thereof, said connecting pin being slidably engaged in said guide hole of said actuator plate;

a biasing means so arranged as to biasingly cause said actuator plate to rotate to a selected one of a first limit point corresponding to said operative position and a second limit point corresponding to said inoperative position in relation to a dead point, thereby allowing said actuator plate to be biasingly toggled between said first limit point and said second limit point in relation to said dead point;

a first pair of a first and a second stopper means;

said first stopper means disposed at said first limit point;

said second stopper means disposed at said second limit point;

a seat belt control means for normally biasing said seat belt to a home position and allowing said seat belt to be movable toward the forward side of said seat cushion by a forward load applied from said passenger who is about to be moved to the forward side of said seat cushion under the influence of said forward inertia caused by collision; and a connecting means for operatively connecting said seat belt control means with said connecting pin;

wherein, normally, said actuator plate is biased by said biasing means to said second stopper means, such that said biasing means is located above said dead point, thereby resiliently retaining said forward buttocks slippage preventive element in said inoperative position, and wherein, in said collision, said forward load draws said seat belt toward said forward side through said seat belt control means, while being imparted through said connecting means to said connecting pin, thereby in turn causing said actuator plate to rotate toward said first stopper means, overcoming a biasing force of said biasing means, so that said biasing means is displaced to a point below said dead point, while simultaneously causing rotation of both said pair of arms and said forward buttocks slippage preventive element in a direction to said operative position, as a result of which, said actuator plate is biased to contact with said first stopper means, whereby the actuator plate is positively retained at a point to prevent rotation of said pair of arms toward said inoperative position, thereby preventing further forward rotation of said forward buttocks slippage preventive element from said operative position.

2. The vehicle seat structure as claimed in claim 1, wherein said guide hole is formed in a free end portion of said actuator plate in a sinuous manner along a locus in which said connecting pin is to be moved in said actuator plate with rotation of said pair of arms, due to a deviation in circular orbit between said another end of said each of said pair of arms and said free end portion of said actuator plate, wherein said guide hole has one end region and another end region, wherein, when said actuator plate is biased by said biasing means to contact with said second stopper means, said connecting pin is engaged in said one end region of said guide hole, so that said forward buttocks slippage preventive element is retained in said inoperative position, and wherein, when said actuator plate is biased by said biasing means to contact with said first stopper means, said connecting pin is engaged in said another end region of said guide hole, such that said actuator plate is positively retained at a point to prevent said rotation of said pair of arms toward said inoperative position, thereby preventing further forward rotation of said forward buttocks slippage preventive element from said operative position.

3. The vehicle seat structure according to claim 2, wherein, when being biased by said biasing means to contact with said first stopper means, said actuator plate is retained in a substantially horizontally extending state, while said pair of arms are retained in a substantially vertically extending state to thereby retain said forward buttocks slippage preventive element in said operative position, and wherein said guide hole is of such a sinuous manner that, when the actuator plate is retained in said substantially horizontally extending state, said another end region of the guide hole is brought into a downwardly opened state, and said connecting pin is engaged in the downwardly opened state of said another end region of the guide hole, whereby said pair of arms and said forward buttocks slippage preventive element are positively prevented against rotation toward said inoperative position, while allowing said actuator plate to be rotated upwardly from said substantially horizontally extending state to thereby cause said pair of arms and said forward buttocks slippage preventive element to rotate toward said inoperative position.

4. The vehicle seat structure as claimed in claim 1, wherein said dead point is defined near to said second limit point.

5. The vehicle seat structure as claimed in claim 1, wherein said forward buttocks slippage preventive element is a horizontal bar element whose two ends are fixedly connected between said pair of arms.

6. The vehicle seat structure as claimed in claim 1, wherein, said actuator plate has a free end portion in which said guide hole is formed and another end portion rotatably connected with said seat cushion as a center of rotation, and wherein said biasing means comprises a pulling spring extended between said free end portion of said actuator plate and a point away from said another end portion of the actuator plate.

7. The vehicle seat structure as claimed in claim 1, wherein said seat belt control means comprises: a seat belt buckle releasably connected with said seat belt; a rotary link member rotatably provided in said seat cushion, said rotary link member being connected with said seat belt buckle at one end thereof; a return spring means for resiliently biasing said rotary link member in one direction to retain said seat belt buckle at a home position; a cable wire; and an elongated connecting ring having an elongated hole formed therein, wherein said connecting pin is slidably engaged in said elongated hole of said elongated connecting ring, and wherein said cable wire is extended and connected between another end of said rotary link member and said elongated connecting ring, with such an arrangement that, in said collision where said forward load draws said seat belt buckle and seat belt toward said forward side, said rotary link member is rotated in another direction, overcoming a biasing force of said return spring means, thereby drawing said cable wire to cause sliding movement of said connecting pin in and along said elongated connecting ring, which results in causing said actuator plate to rotate from said second stopper means toward said first stopper means against a biasing force of said biasing means, so that said biasing means is displaced to a point below said dead point, while simultaneously causing rotation of both said pair of arms and said forward buttocks slippage preventive element in a direction to said operative position.

8. The vehicle seat structure according to claim 7, wherein a second pair of first and second stopper means are provided on opposite sides of said rotary link member so as to limit a range of rotation of the rotary link member, and wherein said dead point is defined near to said second limit point and a distance between said pair of first and second stopper means is reduced, thereby minimizing a stroke of movement of said seat belt buckle to and away from said seat cushion.

* * * * *